United States Patent
Sai

(10) Patent No.: US 8,315,825 B2
(45) Date of Patent: Nov. 20, 2012

(54) METHOD AND APPARATUS FOR ADAPTIVELY HANDLING LEVEL MEASUREMENTS UNDER UNSTABLE CONDITIONS

(75) Inventor: Bin Sai, Zuid Holland (NL)

(73) Assignee: Enraf B.V., Delft (NL)

( * ) Notice: Subject to any disclaimer, the term of this patent is extended or adjusted under 35 U.S.C. 154(b) by 472 days.

(21) Appl. No.: 12/534,702

(22) Filed: Aug. 3, 2009

(65) Prior Publication Data

US 2010/0070209 A1    Mar. 18, 2010

Related U.S. Application Data

(60) Provisional application No. 61/098,183, filed on Sep. 18, 2008.

(51) Int. Cl.
 *G01F 17/00* (2006.01)
 *G01F 23/00* (2006.01)
(52) U.S. Cl. ............... 702/55; 702/56; 702/57; 702/190
(58) Field of Classification Search .............. 702/55–62, 702/182–190
See application file for complete search history.

(56) References Cited

U.S. PATENT DOCUMENTS

| | | | |
|---|---|---|---|
| 4,928,525 A * | 5/1990 | Aderholt et al. | ............ 73/29 V |
| 5,400,253 A | 3/1995 | O'Connor | |
| 5,406,842 A | 4/1995 | Locke | |
| 2002/0101373 A1 | 8/2002 | Arndt et al. | |
| 2005/0052314 A1 | 3/2005 | Spanke et al. | |
| 2006/0044145 A1 * | 3/2006 | Akerstrom et al. | ............ 340/612 |
| 2006/0044147 A1 | 3/2006 | Knox et al. | |
| 2010/0002912 A1 | 1/2010 | Solinsky | |

FOREIGN PATENT DOCUMENTS

GB    2 064 188 A    6/1981
WO    WO 2004/018978 A1    3/2004

OTHER PUBLICATIONS

European Search Report dated Dec. 14, 2009 in connection with European Patent Application No. EP 09169534.
Communication pursuant to Article 94(3) EPC dated Jan. 11, 2010 in connection with European Patent Application No. EP 09169534.

* cited by examiner

*Primary Examiner* — Phuong Huynh

(57) ABSTRACT

A method includes retrieving at least one first measurement associated with material in a tank from a memory at a level gauge. The method also includes comparing the at least one first measurement to at least one second measurement associated with the material in the tank. The method further includes determining whether a difference between the at least one first measurement and the at least one second measurement exceeds a threshold. In addition, the method includes identifying a current level of the material in the tank in a first manner if the difference does not exceed the threshold or a second manner if the difference does exceed the threshold. The first manner could include correcting a level measurement using the difference between the at least one first measurement and the at least one second measurement. The second manner could include identifying an offset value based on differences between pairs of level measurements.

20 Claims, 3 Drawing Sheets

METHOD AND APPARATUS FOR ADAPTIVELY HANDLING LEVEL MEASUREMENTS UNDER UNSTABLE CONDITIONS

CROSS-REFERENCE TO RELATED APPLICATIONS

This application claims priority under 35 U.S.C. §119(e) to U.S. Provisional Application No. 61/098,183 filed on Sep. 18, 2008, which is hereby incorporated by reference.

TECHNICAL FIELD

This disclosure relates generally to inventory management systems. More specifically, this disclosure relates to a method and apparatus for adaptively handling level measurements under unstable conditions.

BACKGROUND

Processing facilities and other facilities routinely include tanks for storing liquid materials and other materials. For example, storage tanks are routinely used in tank farm facilities and other storage facilities to store oil or other materials. As another example, oil tankers and other transport vessels routinely include numerous tanks storing oil or other materials.

Often times, it is necessary or desirable to measure the amount of material stored in a tank. This may be useful, for example, during loading of material into the tank or unloading of material from the tank. As particular examples, "custody transfers" and "weights and measures of oil" often require highly accurate measurements from level gauging instruments installed on the roof of a tank. In bulk storage tanks, an error of one millimeter in a level reading can correspond to several cubic meters of volumetric error. This can result in losses of thousands of dollars for one or more parties.

One approach to measuring the amount of material in a tank involves non-contact radar sensing, which is becoming more and more popular. In this approach, radar signals are transmitted towards and reflected off the surface of material in a tank. This approach typically offers more flexibility and less maintenance in various tank content measurement scenarios. However, in real-world situations, radar level gauges often cannot perform reliably due to unexpected interferences or other unstable conditions (such as power failures). Moreover, conventional radar level gauges often need to be recalibrated after a power failure.

SUMMARY

This disclosure provides a method and apparatus for adaptively handling level measurements under unstable conditions.

In a first embodiment, a method includes retrieving at least one first measurement associated with material in a tank from a memory at a level gauge. The method also includes comparing the at least one first measurement to at least one second measurement associated with the material in the tank. The method further includes determining whether a difference between the at least one first measurement and the at least one second measurement exceeds a threshold. In addition, the method includes identifying a current level of the material in the tank in a first manner if the difference does not exceed the threshold or a second manner if the difference does exceed the threshold.

In a second embodiment, an apparatus includes an interface configured to receive data identifying wireless signals reflected off material in a tank. The apparatus also includes a processing system configured to retrieve at least one first measurement associated with the material in the tank from a memory and compare the at least one first measurement to at least one second measurement associated with the material in the tank. The at least one second measurement is determined using the data identifying the wireless signals. The processing system is also configured to determine whether a difference between the at least one first measurement and the at least one second measurement exceeds a threshold. In addition, the processing system is configured to identify a current level of the material in the tank in a first manner if the difference does not exceed the threshold or a second manner if the difference does exceed the threshold.

In a third embodiment, a computer readable medium embodies a computer program. The computer program includes computer readable program code for retrieving at least one first measurement associated with material in a tank from a memory at a level gauge. The computer program also includes computer readable program code for comparing the at least one first measurement to at least one second measurement associated with the material in the tank. The computer program further includes computer readable program code for determining whether a difference between the at least one first measurement and the at least one second measurement exceeds a threshold. In addition, the computer program includes computer readable program code for identifying a current level of the material in the tank in a first manner if the difference does not exceed the threshold or a second manner if the difference does exceed the threshold.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
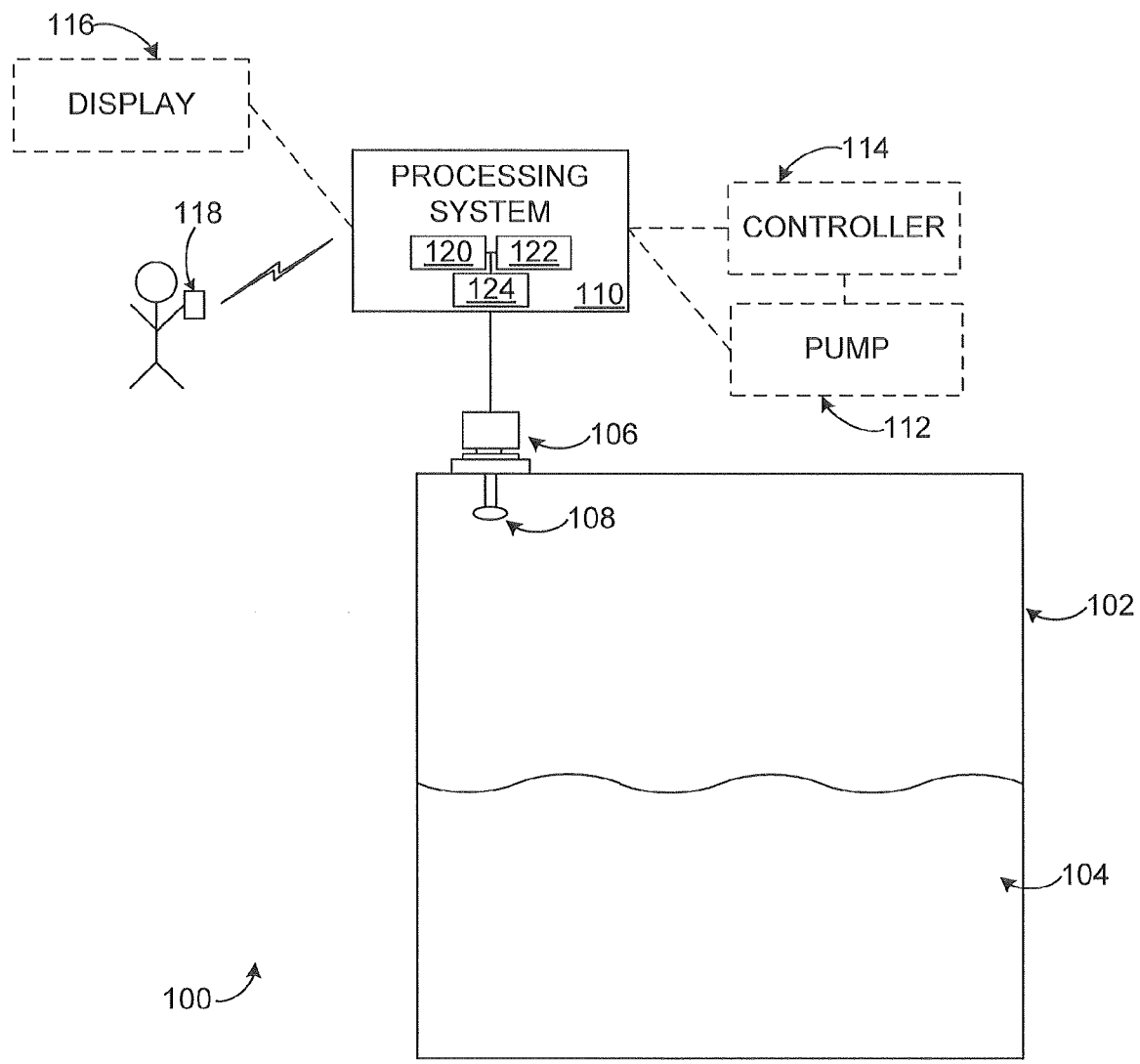
FIG. 1 illustrates an example tank level measurement system according to this disclosure.
Figure 2:
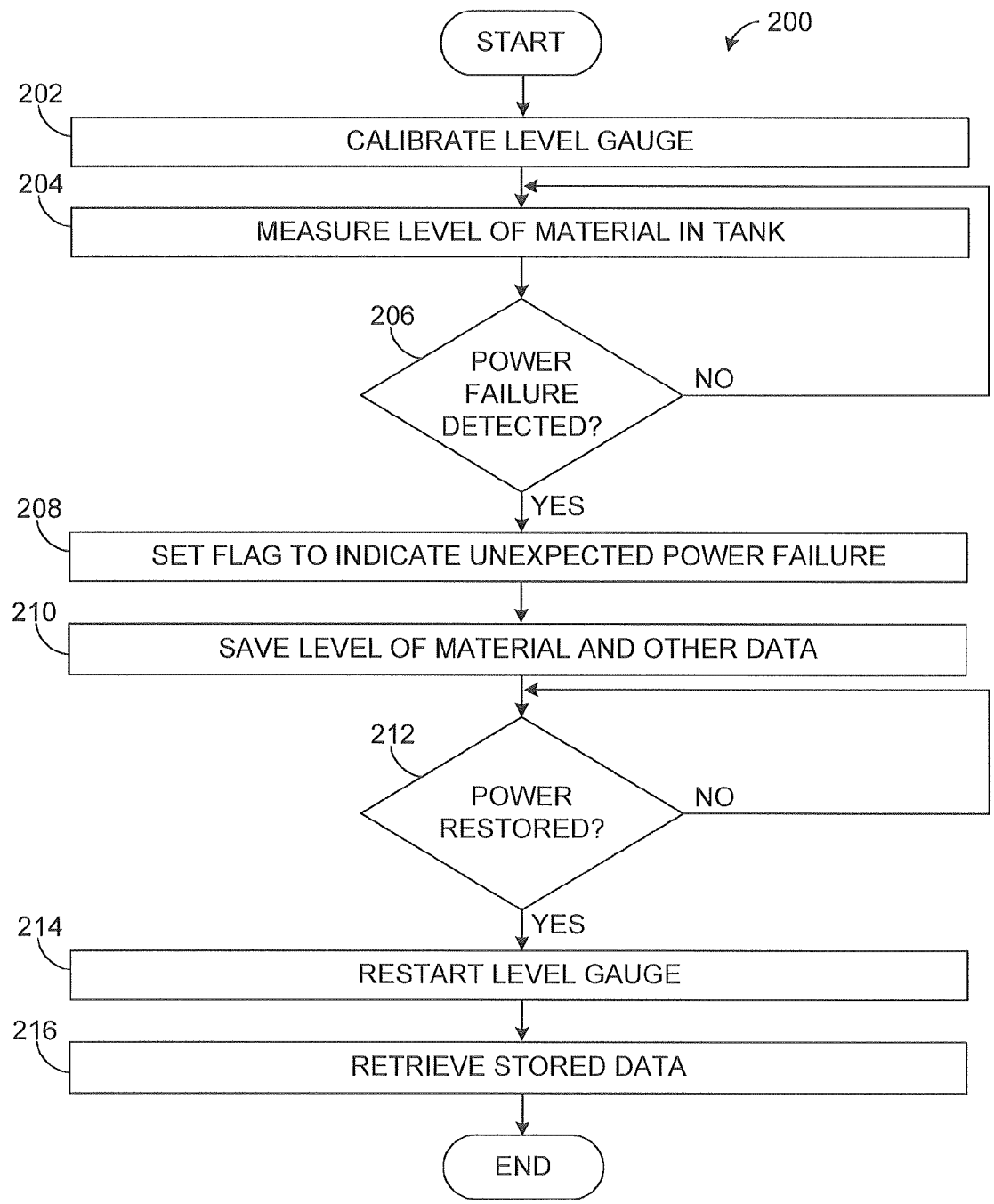
FIG. 2 illustrates an example method for storing level gauge parameters according to this disclosure.
Figure 3:
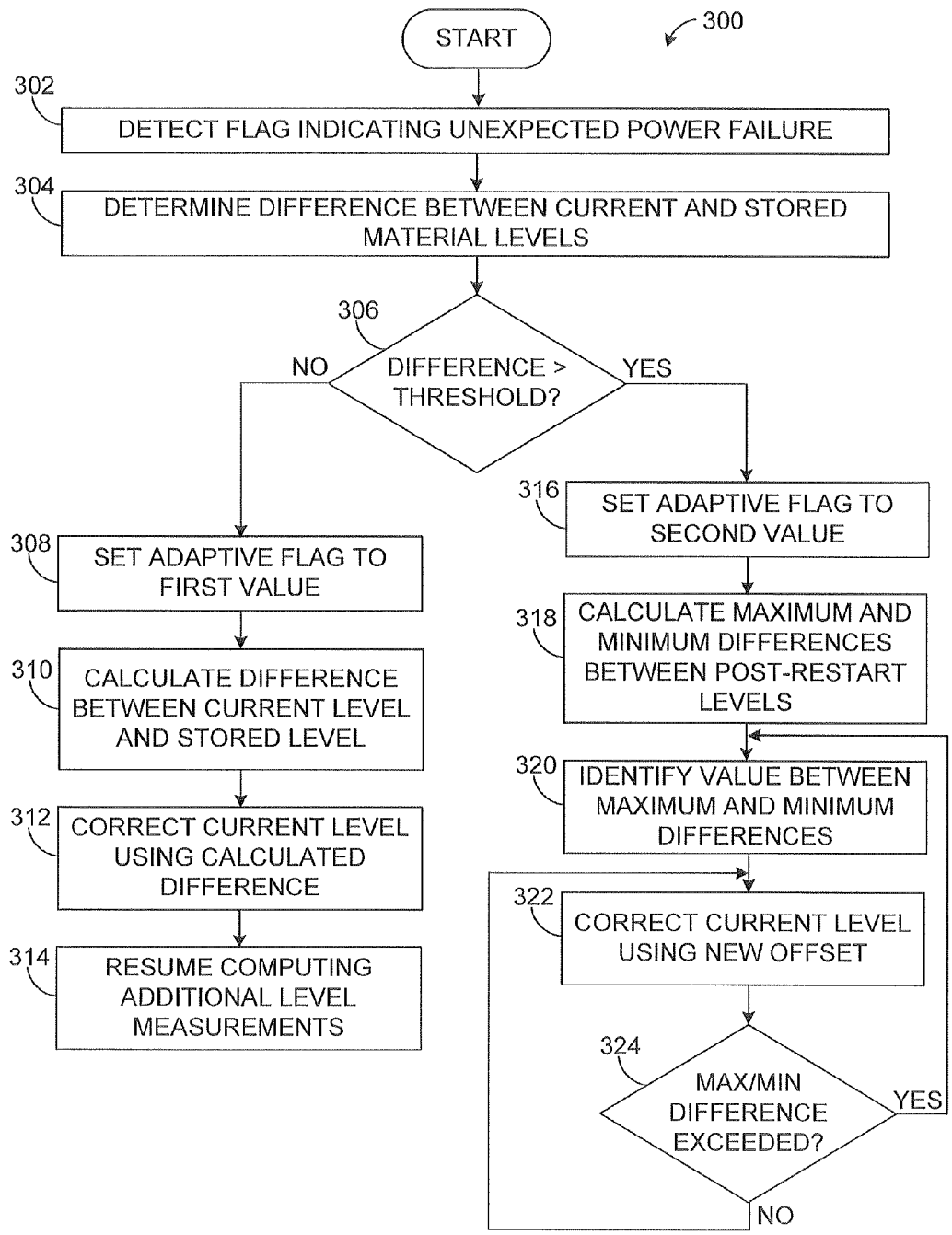
FIG. 3 illustrates an example method for recovering from a power failure using stored level gauge parameters according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example tank level measurement system 100 according to this disclosure. In this example, the system 100 includes a tank 102 that can store one or more materials 104. The tank 102 generally represents any suitable structure for receiving and storing at least one liquid or other material. The tank 102 could, for example, represent an oil storage tank or a tank for storing other liquid(s) or other material(s). The tank 102 could also have any suitable shape and size. Further, the tank 102 could form part of a larger structure. The larger structure could represent any fixed or movable structure containing or associated with one or more tanks 102, such as a movable tanker vessel, railcar, or truck or a fixed tank farm.

A sensor 106 with at least one antenna 108 is used in conjunction with a processing system 110 to measure the level of material 104 in the tank 102. The antenna 108 emits electromagnetic waves or other wireless signals towards the material 104 and receives reflected signals from the material 104. The sensor 106 includes any suitable structure for generating signals for wireless transmission and for receiving reflected signals. The antenna 108 includes any suitable structure for transmitting and/or receiving wireless signals, such as a planar or horn antenna.

Data from the sensor 106 is provided to the processing system 110. The processing system 110 can use the data from the sensor 106 in any suitable manner. For example, the sensor 106 could provide data identifying the transmitted and reflected signals, and the processing system 110 can analyze the data to identify the level of the material 104 in the tank 102. The processing system 110 could also use the determined level in any suitable manner. For example, the processing system 110 could control automatic loading or unloading of the tank 102 by controlling a pump 112 or by providing the determined level to an external controller 114 that controls the pump 112. The processing system 110 could also notify personnel responsible for controlling the loading or unloading of the tank 102, such as by displaying the determined level on a display 116 or transmitting the determined level to a wireless or other device 118.

The processing system 110 could represent any suitable computing or processing system or device, such as a computing device, a process controller, or other system or device. In particular embodiments, the processing system 110 includes at least one processor 120 and at least one memory 122 storing instructions and data used, generated, or collected by the at least one processor 120. At least one memory 122 could represent a non-volatile memory storage device, which can retain stored data even during a loss of power. The processing system 110 can also include at least one interface 124 facilitating communication with external devices or systems like the components 106 and 112-118, such as an Ethernet interface, a radio frequency (RF) or other wireless interface, or a serial interface.

In one aspect of operation, the processing system 110 implements a self-adaptive signal-processing algorithm for adaptive identification and handling of interferences in tank level measurements under unstable circumstances (the algorithm could be implemented using any hardware, software, firmware, or combination thereof). The algorithm can intelligently determine the accurate level of material 104 in the tank 102 in various situations, such as when multi-path effects in combination with unexpected interruptions of the measurements might normally impose severe impacts on precision and consistency. As examples, the algorithm can be used to tackle problems caused by several scenarios in material level measurements, such as by handling the following situations automatically:

(1) A power break or interruption causes both pumping and gauging processes to stop. After power is restored, the pumping and gauging processes can resume.

(2) A power break or interruption causes the gauging process to stop, but the pumping process continues. After some amount of time, the power to the level gauge is restored, and the gauging process can resume.

The algorithm makes it possible for the processing system 110 to identify which scenario has occurred and to decide which adaptive mechanism is applied automatically. In both scenarios, the algorithm can save the data that is needed for calibration (which would normally require engineers to go to a tank roof and perform a manual calibration). The measurement accuracy before and after the power interruption could therefore remain identical or almost the same, such as when the deviation is less than 0.5 mm. Also, the algorithm may be capable of coping with worst case scenarios, such as when a power interruption occurs at the time when the severest interferences from a tank wall and/or from obstacles in the tank 102 (such as agitators and ladders) are being generated. The phrase "maximum error effect" could be used here, and this phrase refers to the largest measurement error incurred by unwanted reflection interferences. The algorithm can help to ensure safe operation and provide highly reliable gauging in these various circumstances.

Note that the "level" of material 104 in a tank 102 could refer to the absolute level of the material 104 in the tank 102, such as when the level represents the distance between the top of the material 104 and the bottom of the tank 102. The "level" could also refer to the relative level of the material 104 in the tank 102, such as when the level represents the distance between the top of the material 104 and the antenna 108. In this document, the phrase "ullage level" refers to a measure of the empty space above the material 104 in the tank 102, such as the space between the top of the material 104 and the antenna 108.

Although FIG. 1 illustrates an example tank level measurement system 100, various changes may be made to FIG. 1. For example, the system 100 could include any number of tanks 102, sensors 106, processing systems 110, and other components. Also, the functional division shown in FIG. 1 is for illustration only. Various components in FIG. 1 could be omitted, combined, or further subdivided and additional components could be added according to particular needs. As a particular example, the processing system 110 could be integrated into (form a part of) the sensor 106.

FIG. 2 illustrates an example method 200 for storing level gauge parameters according to this disclosure. As shown in FIG. 2, a level gauge is calibrated at step 202. This could include, for example, engineers or other personnel calibrating the sensor 106/ processing system 110 during installation or commissioning. Among other things, an offset value can be identified during the calibration, and the offset value is used later during actual level measurements.

One or more levels of material in a tank are measured using the level gauge at step 204. This could include, for example, the sensor 106 transmitting and receiving wireless signals to and from the material 104 in the tank 102. This could also include the processing system 110 determining one or more ullage levels of the material 104 using the offset value identified during the calibration. In particular embodiments, two types of ullage levels could be determined. A power spectral density (PSD) ullage level is determined by using the power spectral density of wireless signals to calculate the distance between the antenna 108 and the surface of the material 104. A phase ullage level is determined by using a phase-distance formula to calculate the distance between the antenna 108 and the surface of the material 104.

A power failure may be detected at step 206. This could include, for example, circuitry in the processing system 110 detecting a loss of power. If a power failure is detected, this triggers the storage of various parameters into a non-volatile memory. For example, a flag is set to indicate an unexpected power failure at step 208, and one or more material levels and other data (such as the flag) are stored at step 210. Both steps 208-210 may, for example, include the processing system 110 storing the data values in a non-volatile memory 122, such as an NV-RAM. In some embodiments, the flag here could have a value of "0" for no power down, "1" for a normal power down, and "2" for an abnormal power down. Also, the offset value or other calibration data can be saved in the non-volatile memory, such as in hexadecimal format. Note that any suitable number of prior level measurements could be stored in the memory.

When power is eventually restored at step 212, the level gauge is restarted at step 214, and the data is retrieved from the non-volatile memory at step 216. This could include, for example, the processing system 110 retrieving the stored offset value, as well as the previously saved ullage levels and the flag. At this point, the method 200 ends, and the level gauge can use the retrieved data to recover and begin taking level measurements again. An example method for recovering from a power failure at a level gauge is shown in FIG. 3, which is described below. Note that because a fixed offset value can be retrieved from the memory, there may be no need to perform a manual re-calibration or parameter setting for the level gauge after the restart.

Although FIG. 2 illustrates an example method 200 for storing level gauge parameters, various changes may be made to FIG. 2. For example, while shown as a series of steps, various steps in FIG. 2 may overlap, occur in parallel, or occur multiple times.

FIG. 3 illustrates an example method 300 for recovering from a power failure using stored level gauge parameters according to this disclosure. In particular, the method 300 of FIG. 3 could be used in a level gauge after the level gauge has performed the method 200 of FIG. 2 and retrieved various stored information from a non-volatile memory.

When a level gauge is deactivated (such as due to a power failure), the level of material in a tank 102 may or may not change during that time. As a result, when the level gauge is restarted (such as after power is restored), the material level might have change considerably during the gauge's off period. It is also possible that severe interferences from obstructions and the tank wall could occur at the same time, making it difficult to simply restore the level gauge with its prior settings. While these situations may occur infrequently, safety and reliability regulations often impose strict measurement requirements in order to prevent any hazardous accidents from occurring.

The method 300 in FIG. 3 determines if it is possible to restore the level gauge using the stored settings. More specifically, the method 300 operates as shown in FIG. 3 to correct a current level measurement based on either (i) a difference between pre-failure and post-failure level measurements or (ii) an offset value.

As shown in FIG. 3, the level gauge detects a flag indicating that an unexpected power failure occurred at step 302. This may include, for example, the processing system 110 detecting the appropriate flag value after power has been restored and the flag's value has been retrieved from non-volatile memory.

The level gauge then determines the difference between current (post-restart) and stored (pre-restart) level measurements at step 304. This could include, for example, the processing system 110 determining a difference between current and stored PSD ullage levels and a difference between current and stored phase ullage levels. The level gauge also determines whether the difference is greater than a specified threshold at step 306. The specified threshold could represent any suitable value(s), such as a fraction (like one quarter or one half) of the wavelength of the wireless signals.

If the difference is not greater than the threshold, the level of the material 104 in the tank 102 may not have changed significantly during the level gauge's off time, and significant interference may not be occurring. In this case, an adaptive flag is set to a first value (such as "1") at step 308. Also, a difference between current and stored level measurements is determined at step 310. This could include, for example, the processing system 110 determining a difference between a current phase ullage level and a stored phase ullage level. After that, the current measured level of the material is corrected using the difference at step 312. This could include, for example, the processing system 110 using the difference identified at step 310 as a new offset in the calculation of the current material level. The level gauge may then resume normal calculations for additional level measurements at step 314.

If the difference is greater than the specified threshold at step 306, the level of material 104 in the tank 102 may have changed significantly during the level gauge's off time, and/or significant interference may be occurring (and possibly the "maximum error effect" is being experienced). In this case, the stored level measurements in the memory may not be needed. Instead, this part of the method 300 is invoked automatically to identify the deviation of the offset value and to correct the offset value without requiring any manual operations.

More specifically, the adaptive flag is set to a second value (such as "2") at step 316. Maximum and minimum differences between post-restart level measurements are determined at step 318. This could include, for example, the processing system 110 identifying the maximum and minimum differences between corresponding PSD and phase ullage levels. The PSD and phase ullage levels used here may represent a series of measurements taken after the level gauge restarts. The series of measurements could, for example, be stored in one or more arrays. A value between the maximum and minimum differences is determined at step 320, such as by identifying the value in the middle between the maximum and minimum differences (the average of the maximum and minimum differences). This value is used as a new offset value to correct a current level measurement at step 322. As long as the current difference (such as the difference between current PSD and phase levels) remains within the range defined by the maximum and minimum differences at step 324, the process may return to step 322 to calculate additional level measurements using the selected offset value. However, if a difference ever exceeds the maximum difference or falls below the minimum difference, the process returns to step 320 to select a new offset value using the new maximum or minimum difference.

In this example, the time required by the adaptation process may depend on the measuring rate of the level gauge and the movement speed of the material 104 in the tank 102.

Although FIG. 3 illustrates an example method 300 for recovering from a power failure using stored level gauge parameters, various changes may be made to FIG. 3. For example, while shown as a series of steps, various steps in FIG. 3 may overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "algorithm" and "program" refers to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying a level of material in a tank using at least one processing device, wherein identifying the level of the material in the tank comprises:
      retrieving at least one first measurement associated with the material in the tank from a memory at a level gauge;
      comparing the at least one first measurement to at least one second measurement associated with the material in the tank;
      determining whether a difference between the at least one first measurement and the at least one second measurement exceeds a threshold; and
      identifying a current level of the material in the tank in one of: a first manner if the difference does not exceed the threshold and a second manner if the difference does exceed the threshold.

2. The method of claim 1, wherein identifying the current level of the material in the tank in the first manner comprises:
   correcting a measurement associated with the current level of the material in the tank using the difference between the at least one first measurement and the at least one second measurement.

3. The method of claim 2, further comprising:
   after correcting the measurement associated with the current level of the material in the tank, obtaining a plurality of additional measurements associated with the level of the material in the tank.

4. The method of claim 1, wherein identifying the current level of the material in the tank in the second manner comprises:
   obtaining multiple pairs of measurements associated with the level of the material in the tank;
   determining multiple difference values, each difference value representing a difference between one pair of measurements;
   identifying an offset value based on the determined difference values; and
   determining the current level of the material in the tank using the offset value.

5. The method of claim 4, wherein identifying the offset value comprises:
   identifying maximum and minimum difference values; and
   identifying an average of the maximum and minimum difference values, the offset value comprising the average.

6. The method of claim 5, further comprising:
   obtaining an additional pair of measurements;
   determining an additional difference value between the additional pair of measurements;
   if the additional difference value is larger than the minimum difference value and smaller than the maximum difference value, using the additional pair of measurements and the offset value to identify the level of the material in the tank; and
   if the additional difference value is smaller than the minimum difference value or larger than the maximum difference value, (i) determining an updated offset value using the additional difference value and (ii) using the additional pair of measurements and the updated offset value to identify the level of the material in the tank.

7. The method of claim 4, wherein each pair of measurements comprises:
   a power spectral density ullage level; and
   a phase ullage level.

8. The method of claim 1, wherein the threshold comprises a fraction of a wavelength of wireless signals transmitted towards and reflected off the material in the tank.

9. The method of claim 1, further comprising:
   detecting a power failure at the level gauge;
   storing the at least one first measurement in the memory and setting a flag indicating that the power failure occurred in response to detecting the power failure; and
   after power is restored, detecting the flag indicating that the power failure occurred;
   wherein the comparing, determining, and identifying steps occur in response to detecting the flag.

10. The method of claim 9, wherein the current level of the material in the tank is identified after the power is restored without requiring manual recalibration of the level gauge, even during occurrence of maximum error effect after the power is restored.

11. An apparatus comprising:
    an interface configured to receive data identifying wireless signals reflected off material in a tank; and
    a processing system configured to:
       retrieve at least one first measurement associated with the material in the tank from a memory;
       compare the at least one first measurement to at least one second measurement associated with the material in the tank, the at least one second measurement determined using the data identifying the wireless signals;

determine whether a difference between the at least one first measurement and the at least one second measurement exceeds a threshold; and identify a current level of the material in the tank in one of: a first manner if the difference does not exceed the threshold and a second manner if the difference does exceed the threshold.

12. The apparatus of claim 11, wherein the processing system is configured to identify the current level of the material in the tank in the second manner by:

obtaining multiple pairs of measurements associated with the level of the material in the tank;

determining multiple difference values, each difference value representing a difference between one pair of measurements;

identifying an offset value based on the determined difference values; and determining the current level of the material in the tank using the offset value.

13. The apparatus of claim 12, wherein the processing system is configured to identify the offset value by:

identifying maximum and minimum difference values; and identifying an average of the maximum and minimum difference values, the offset value comprising the average.

14. The apparatus of claim 13, wherein the processing system is further configured to:

obtain an additional pair of measurements;

determine an additional difference value between the additional pair of measurements;

if the additional difference value is larger than the minimum difference value and smaller than the maximum difference value, use the additional pair of measurements and the offset value to identify the level of the material in the tank; and if the additional difference value is smaller than the minimum difference value or larger than the maximum difference value, (i) determine an updated offset value using the additional difference value and (ii) use the additional pair of measurements and the updated offset value to identify the level of the material in the tank.

15. The apparatus of claim 11, wherein the processing system is further configured to:

detect a power failure at the apparatus;

store the at least one first measurement in the memory and set a flag indicating that the power failure occurred in response to detecting the power failure; and detect the flag indicating that the power failure occurred after power is restored;

wherein the processing system is configured to perform the comparing, determining, and identifying operations in response to detecting the flag.

16. A non-transitory computer readable medium embodying a computer program, the computer program comprising computer readable program code that when executed causes at least one data processing system to perform the steps of:

retrieving at least one first measurement associated with material in a tank from a memory at a level gauge;

comparing the at least one first measurement to at least one second measurement associated with the material in the tank;

determining whether a difference between the at least one first measurement and the at least one second measurement exceeds a threshold; and identifying a current level of the material in the tank in one of: a first manner if the difference does not exceed the threshold and a second manner if the difference does exceed the threshold.

17. The non-transitory computer readable medium of claim 16, wherein the computer readable program code that causes the at least one data processing system to identify the current level of the material in the tank in the first manner comprises computer readable program code that when executed causes the at least one data processing system to perform the step of:

correcting a measurement associated with the current level of the material in the tank using the difference between the at least one first measurement and the at least one second measurement.

18. The non-transitory computer readable medium of claim 16, wherein the computer readable program code that causes the at least one data processing system to identify the current level of the material in the tank in the second manner comprises computer readable program code that when executed causes the at least one data processing system to perform the steps of:

obtaining multiple pairs of measurements associated with the level of the material in the tank;

determining multiple difference values, each difference value representing a difference between one pair of measurements;

identifying an offset value based on the determined difference values; and determining the current level of the material in the tank using the offset value.

19. The non-transitory computer readable medium of claim 18, wherein the computer readable program code that causes the at least one data processing system to identify the offset value comprises computer readable program code that when executed causes the at least one data processing system to perform the steps of:

identifying maximum and minimum difference values;

identifying an average of the maximum and minimum difference values, the offset value comprising the average;

obtaining an additional pair of measurements;

determining an additional difference value between the additional pair of measurements; and determining an updated offset value using the additional difference value if the additional difference value is smaller than the minimum difference value or larger than the maximum difference value.

20. The non-transitory computer readable medium of claim 16, wherein the computer program further comprises computer readable program code that when executed causes the at least one data processing system to perform the steps of:

detecting a power failure at the level gauge;

storing the at least one first measurement in the memory and setting a flag indicating that the power failure occurred in response to detecting the power failure; and detecting the flag indicating that the power failure occurred after power is restored;

wherein the comparing, determining, and identifying steps occur in response to detecting the flag.

* * * * *